United States Patent
Kim et al.

(10) Patent No.: US 10,244,508 B2
(45) Date of Patent: Mar. 26, 2019

(54) METHOD AND DEVICE BY WHICH MACHINE TYPE COMMUNICATION TERMINAL TRANSMITS AND RECEIVES DATA IN WIRELESS ACCESS SYSTEM SUPPORTING MACHINE TYPE COMMUNICATION

(71) Applicant: LG ELECTRONICS INC., Seoul (KR)

(72) Inventors: Bonghoe Kim, Seoul (KR); Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/523,624

(22) PCT Filed: Nov. 4, 2015

(86) PCT No.: PCT/KR2015/011798
§ 371 (c)(1),
(2) Date: May 1, 2017

(87) PCT Pub. No.: WO2016/072746
PCT Pub. Date: May 12, 2016

(65) Prior Publication Data
US 2017/0311294 A1 Oct. 26, 2017

Related U.S. Application Data

(60) Provisional application No. 62/075,881, filed on Nov. 5, 2014.

(51) Int. Cl.
*H04W 4/00* (2018.01)
*H04W 72/04* (2009.01)
(Continued)

(52) U.S. Cl.
CPC ............ *H04W 72/04* (2013.01); *H04L 1/00* (2013.01); *H04L 1/0003* (2013.01);
(Continued)

(58) Field of Classification Search
None
See application file for complete search history.

(56) References Cited

U.S. PATENT DOCUMENTS

2015/0296518 A1* 10/2015 Yi .............................. H04L 1/08
370/336
2016/0112898 A1* 4/2016 Chen .................. H04W 28/0215
370/235
(Continued)

FOREIGN PATENT DOCUMENTS

KR 1020140006304 A 1/2014
KR 1020140071480 A 6/2014
(Continued)

*Primary Examiner* — Anh Vu H Ly
(74) *Attorney, Agent, or Firm* — Dentons US LLP

(57) ABSTRACT

The present invention relates to a wireless access system supporting machine type communication (MTC), and according to one embodiment of the present invention, a method by which an MTC terminal transmits a hybrid automatic repeat request-acknowledgement (HARQ-ACK) in a wireless access system supporting machine type communication (MTC) can comprise the steps of: monitoring a physical downlink control channel (PDCCH) in a monitoring section having N number of subframes; receiving at least one PDCCH in the N number of subframes; and transmitting HARQ-ACK corresponding to all subframes included in the monitoring section in the Xth subframe after the end subframe of the monitoring section.

6 Claims, 11 Drawing Sheets

(51) Int. Cl.
*H04L 1/00* (2006.01)
*H04W 4/70* (2018.01)
*H04L 5/00* (2006.01)

(52) U.S. Cl.
CPC .......... *H04L 1/0009* (2013.01); *H04L 5/0044* (2013.01); *H04L 5/0094* (2013.01); *H04W 4/70* (2018.02); *H04L 5/001* (2013.01); *H04L 5/0023* (2013.01)

(56) References Cited

U.S. PATENT DOCUMENTS

| | | | |
|---|---|---|---|
| 2017/0237535 A1* | 8/2017 | Park | H04L 5/0035 370/329 |
| 2017/0289973 A1* | 10/2017 | Yang | H04W 72/042 370/328 |
| 2018/0007683 A1* | 1/2018 | You | H04W 72/0413 370/328 |
| 2018/0102890 A1* | 4/2018 | Yi | H04L 5/0053 370/328 |
| 2018/0115962 A1* | 4/2018 | Kim | H04W 4/70 370/328 |

FOREIGN PATENT DOCUMENTS

| | | |
|---|---|---|
| WO | 2014021632 A1 | 2/2014 |
| WO | 2014069946 A1 | 5/2014 |
| WO | 2014098358 A1 | 6/2014 |

\* cited by examiner

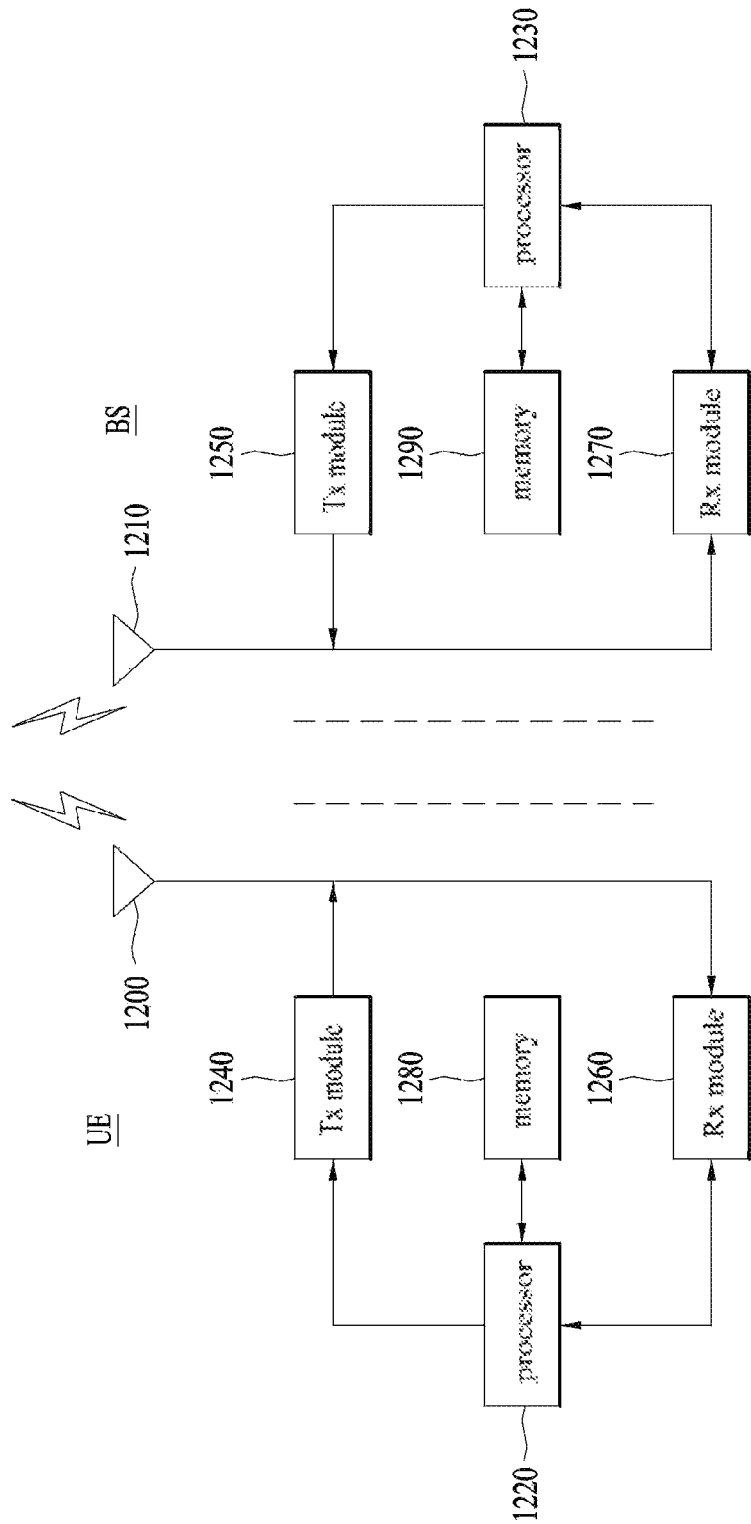

METHOD AND DEVICE BY WHICH MACHINE TYPE COMMUNICATION TERMINAL TRANSMITS AND RECEIVES DATA IN WIRELESS ACCESS SYSTEM SUPPORTING MACHINE TYPE COMMUNICATION

This application is a National Stage Application of International Application No. PCT/KR2015/011798, filed on Nov. 4, 2015, which claims the benefit of U.S. Provisional Application No. 62/075,881, filed on Nov. 5, 2014, all of which are hereby incorporated by reference in their entirety for all purposes as if fully set forth herein.

TECHNICAL FIELD

The present invention relates to a wireless access system supporting machine type communication (MTC), and more particularly, to methods of configuring a transport block size (TBS) for data transmission and reception at an MTC user equipment, methods of configuring a TBS table, and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

One object of the present invention is to provide various methods for efficiently transmitting and receiving data in a wireless access system supporting MTC.

Another object of the present invention is to provide TBS configuration methods to support a narrow bandwidth for an MTC user equipment when a bandwidth supported by the MTC user equipment is significantly narrower than that supported by a non-MTC user equipment.

A further object of the present invention is to provide apparatuses for supporting the above-mentioned methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solutions

The present invention relates to a wireless access system supporting machine type communication (MTC). More particularly, the invention is directed to methods of configuring a transport block size (TBS) for data transmission and reception at an MTC user equipment, methods of configuring a TBS table, and devices for supporting the same.

In an aspect of the present invention, provided herein is a method of receiving data by a machine type communication (MTC) user equipment (UE) in a wireless access system supporting MTC, including: receiving a modulation and coding scheme (MCS) index indicating an MCS and a physical resource block (PRB) index indicating a size of a PRB allocated to the MTC UE; deriving a transport block size (TBS) based on a TBS index indicating a TBS, which is derived based on the MCS index, and the PRB index; and decoding a physical downlink shared channel (PDSCH) based on the TBS to receive the data. In this case, the wireless access system supporting the MTC may support a very narrow band compared to a wireless access system supporting a non-MTC UE and the TBS may be defined to be suitable for transmission and reception of the PDSCH through the narrow band.

Preferably, deriving the TBS may include deriving the TBS from a second TBS table newly defined for the MTC UE. In this case, the TBS table may be configured to support up to 6 PRBs.

More preferably, the method may further include receiving a higher layer signal indicating use of the newly defined second TBS table.

Preferably, in deriving the TBS, the MTC UE may calculate the TBS using a ratio n/m of the number n of resource elements (REs) that can be allocated to the MTC UE to the number m of REs that can be allocated to the non-MTC UE.

In another aspect of the present invention, provided herein is a machine type communication (MTC) user equipment (UE) for receiving data in a wireless access system supporting MTC, including a receiver and a processor functionally connected to the receiver.

In this case, the processor may be configured to control the receiver to receive a modulation and coding scheme (MCS) index indicating an MCS and a physical resource block (PRB) index indicating a size of a PRB allocated to the MTC UE; derive a transport block size (TBS) based on a TBS index indicating a TBS, which is derived based on the MCS index, and the PRB index; and decode a physical downlink shared channel (PDSCH) based on the TBS. Moreover, the wireless access system supporting the MTC may support a very narrow band compared to a wireless access system supporting a non-MTC UE and the TBS may be defined to be suitable for transmission and reception of the PDSCH through the narrow band.

Preferably, the processor may be configured to derive the TBS from a second TBS table newly defined for the MTC UE. In this case, the TBS table may be configured to support up to 6 PRBs.

More preferably, the processor may be configured to control the receiver to further receive a higher layer signal indicating use of the newly defined second TBS table.

Preferably, the processor may be further configured to calculate the TBS using a ratio n/m of the number n of resource elements (REs) that can be allocated to the MTC UE to the number m of REs that can be allocated to the non-MTC UE.

It is to be understood that both the foregoing general description and the following detailed description of the present invention are exemplary and explanatory and are intended to provide further explanation of the invention as claimed.

Advantageous Effects

According to embodiment of the present invention, the following effects can be obtained.

First, an MTC user equipment can not only minimize its power consumption but also efficiently transmit and receive data in a wireless access system supporting MTC.

Second, it is possible to provide a TBS optimized for an MTC user equipment that operates in a narrow bandwidth, thereby maximizing performance of the MTC user equipment.

Third, it is possible to define a new TBS for an MTC user equipment or design a new TBS table to support the new TBS, thereby achieving data transmission and reception optimized for the MTC user equipment without performance degradation with respect to a non-MTC user equipment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 12 is a diagram showing an apparatus for implementing the methods described with reference to FIGS. 1 to 11.

BEST MODE FOR INVENTION

Figure 1:
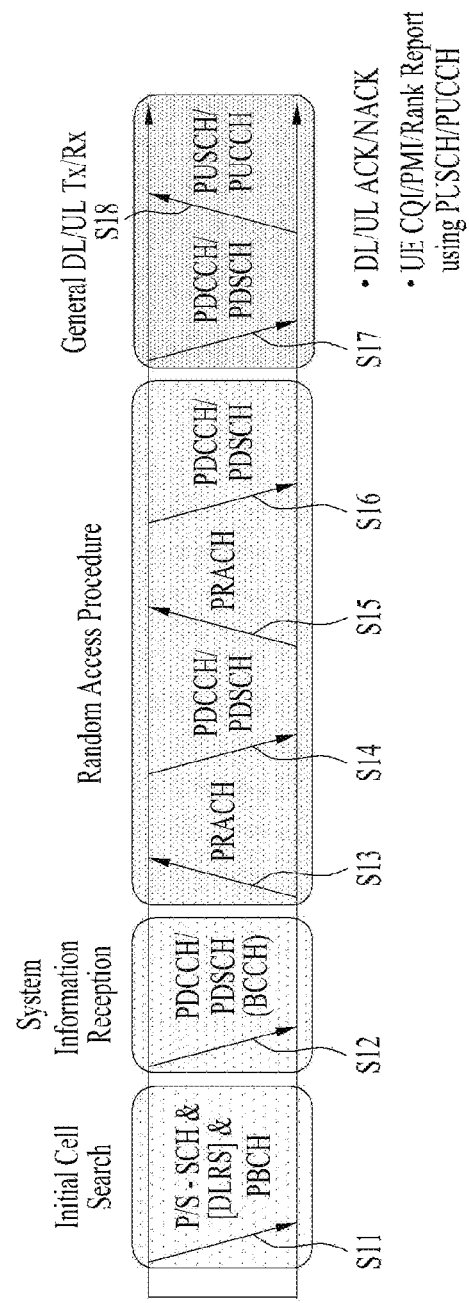
FIG. 1 is a conceptual diagram illustrating physical channels used in the embodiments and a signal transmission method using the physical channels.

The present invention relates to a wireless access system supporting machine type communication (MTC). In particular, the invention provides methods of configuring a transport block size (TBS) for data transmission and reception at an MTC user equipment, methods of configuring a TBS table, and apparatuses for supporting the same The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", C"-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256 QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-TDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-1-DMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
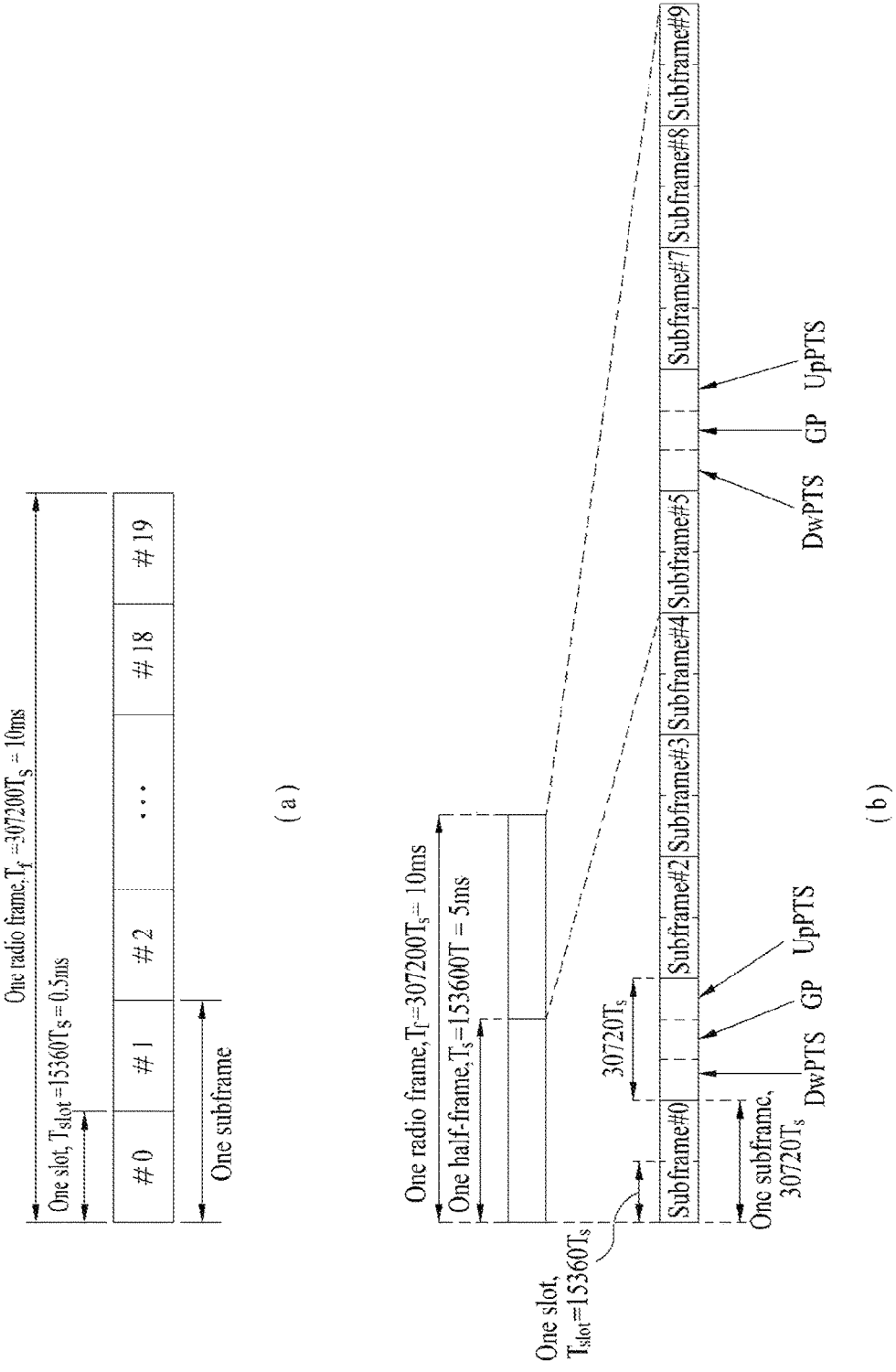
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f$=307200·$T_s$) long, including equal-sized 20 slots indexed from 0 to 19. Each slot is 0.5 ms ($T_{slot}$=15360·$T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s$=1/(15 kHz×2048)=3.2552×$10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f$=307200·$T_s$) long, including two half-frames each having a length of 5 ms (=153600·$T_s$) long. Each half-frame includes five subframes each being 1 ms (=30720·$T_s$) long. An $i^{th}$ subframe includes $2i^{th}$ and $(2i+1)^{th}$ slots each having a length of 0.5 ms ($T_{slot}$=15360·$T_s$). $T_s$ is a sampling time given as $T_s$=1/(15 kHz×2048)=3.2552×10$^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 11

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
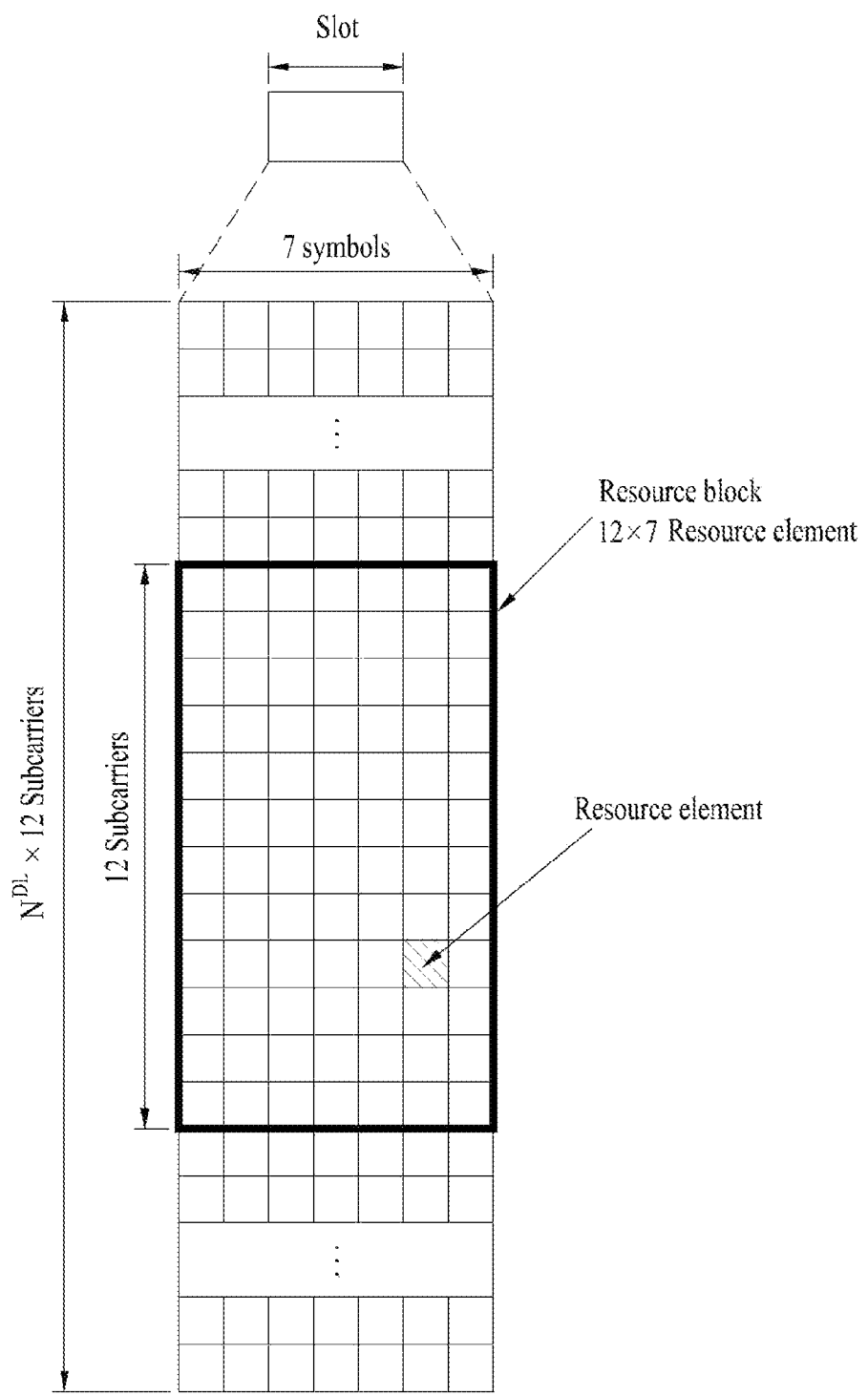
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
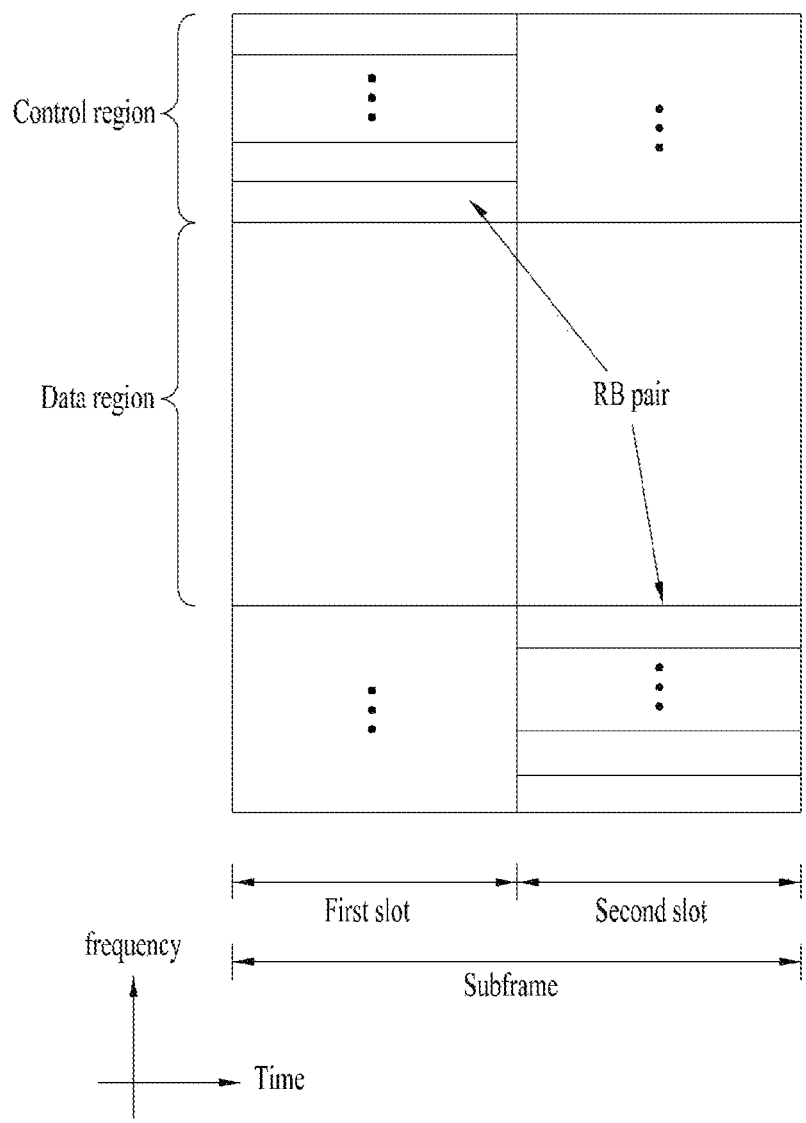
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
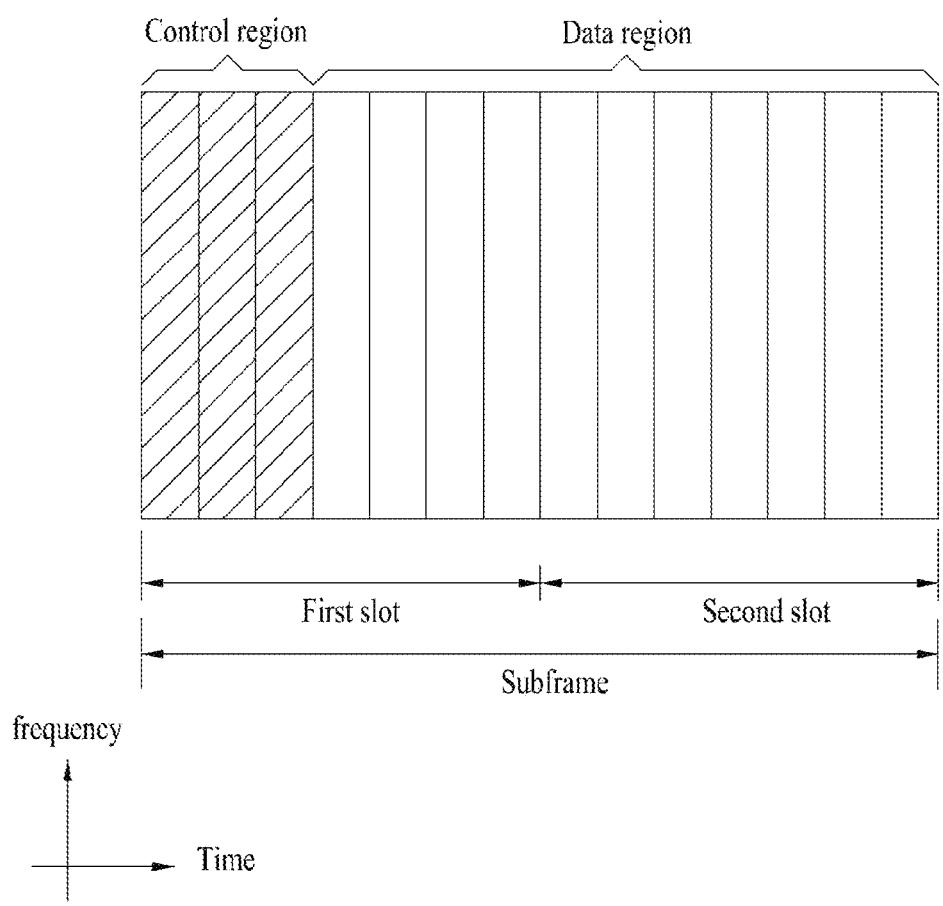
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to $N_{CCE}-1$.

To simplify the decoding process of a UE, a PDCCH format including n CCEs may start with a CCE having an index equal to a multiple of n. That is, given CCE the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |

TABLE 3-continued

| DCI Format | Description |
| --- | --- |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

(1) Transmission mode 1: Single antenna port (port 0);

(2) Transmission mode 2: Transmit diversity;

(3) Transmission mode 3: Open-loop spatial multiplexing when the number of layer is larger than 1 or Transmit diversity when the rank is 1;

(4) Transmission mode 4: Closed-loop spatial multiplexing;

(5) Transmission mode 5: MU-MIMO;

(6) Transmission mode 6: Closed-loop rank-1 precoding;

(7) Transmission mode 7: Precoding supporting a single layer transmission, which does not based on a codebook (Rel-8);

(8) Transmission mode 8: Precoding supporting up to two layers, which do not based on a codebook (Rel-9);

(9) Transmission mode 9: Precoding supporting up to eight layers, which do not based on a codebook (Rel-10); and

(10) Transmission mode 10: Precoding supporting up to eight layers, which do not based on a codebook, used for CoMP (Rel-11).

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

1.2.4 Blind Decoding (BD)

A plurality of PDCCHs may be transmitted in a subframe. That is, the control region of a subframe includes a plurality of CCEs, CCE 0 to CCE $N_{CCE,k}-1$. $N_{CCE,k}$ is the total number of CCEs in the control region of a $k^{th}$ subframe. A UE monitors a plurality of PDCCHs in every subframe. This means that the UE attempts to decode each PDCCH according to a monitored PDCCH format.

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH.

Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1,2,4,8\}$. The CCEs of PDCCH candidate set m in the SS may be determined by the following equation.

$$L \cdot \{(Y_k+m) \bmod \lfloor N_{CCE,k}/L \rfloor\}i \quad \text{[Equation 1]}$$

where $M^{(L)}$ is the number of PDCCH candidates with CCE aggregation level L to be monitored in the SS, $m=0, \ldots, M^{(L)}-1$, i is the index of a CCE in each PDCCH candidate, and $i=0, \ldots, L-1$. $k=\lfloor n_s/2 \rfloor$ where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Search space $S_k^{(L)}$ | | | Number of PDCCH |
|---|---|---|---|
| Type | Aggregation level L | Size [in CCEs] | candidates $M^{(L)}$ |
| UE- | 1 | 6 | 6 |
| specfic | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

where $Y_{-1} = n_{RNTI} \neq 0$, $n_{RNTI}$ indicating an RNTI value. A=39827 and D=65537.

1.3 MCS Information Transmission Method

An eNB may use a downlink control channel (e.g., PDCCH, EPDCCH, etc.) to transmit a transport block size (TBS) for DL data to a UE. In this case, the eNB combines a modulation and coding scheme (MCS) index corresponding to information regarding a modulation and a coding rate with resource allocation information and then transmits information on the TBS through a PDSCH to the UE.

For example, an MCS index ($I_{MCS}$) field has 5 bits and radio resources may be allocated from 1 RB to 110 RBs. In the case of non-MIMO, a TBS (duplication size permission) corresponding to 32 (states)×110 (RBs) may be signaled. However, three states (e.g., 29, 30 and 31) of the 5-bits MCS index field are used to indicate change in the modulation scheme upon retransmission. Thus, only a TBS corresponding to 29×110 can be actually signaled.

In the current LTE/LTE-A system, a modulation scheme for supporting downlink data transmission may be divided into four types: quadrature phase shift keying (QPSK), 16 quadrature amplitude modulation (16 QAM), 64 QAM and 256 QAM. An MCS index indicates a modulation order and a TBS index. In particular, the MCS index indicates the same TBS at a switching point where the modulation scheme is changed for efficient operation in various channel environments. This is because a change in the amount of information that can be transmitted per unit time is less than that in signal to interference plus noise ratio (SINR) at the switching point where the modulation scheme is changed. Thus, even when the modulation scheme is changed at the switching point, the same TBS may be indicated to efficiently allocate radio resources.

To indicate an actual transport block size, an MCS index field (e.g., $I_{MCS}$) transmitted through a downlink control channel is mapped to a different variable (i.e., $I_{TBS}$). Table 6 below shows a modulation order and a TBS index ($I_{TBS}$) depending on a 5-bit MCS index ($I_{MCS}$) for supporting the 64 QAM, which is used in the current LTE/LTE-A system.

TABLE 6

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 |  |
| 31 | 6 |  |

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
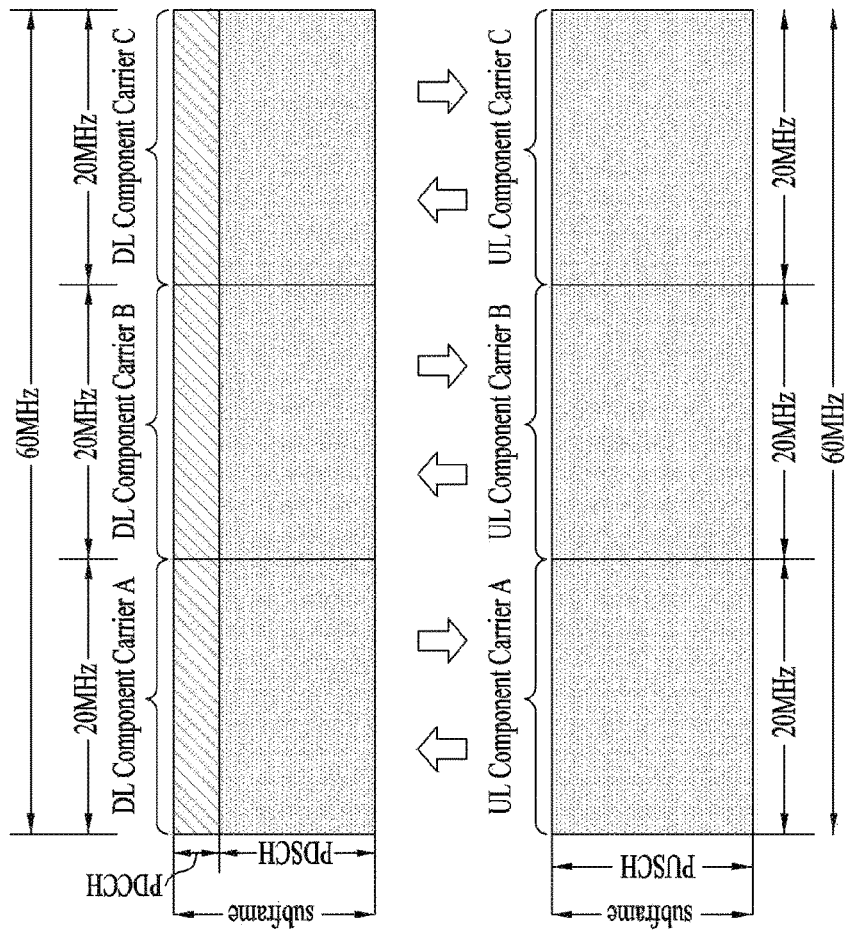
FIG. 6 is a diagram illustrating an example of a component carrier (CC) of the embodiments and carrier aggregation (CA) used in an LTE_A system.

FIG. 6 illustrates an example of CCs and CA in the LTE-A system, which are used in embodiments of the present disclosure.

FIG. 6($a$) illustrates a single carrier structure in the LTE system. There are a DL CC and a UL CC and one CC may have a frequency range of 20 MHz.

FIG. 6($b$) illustrates a CA structure in the LTE-A system. In the illustrated case of FIG. 6($b$), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set may be defined within the UE DL CC set. That is, the eNB transmits a PDCCH only in the PDCCH monitoring set to schedule a PDSCH or PUSCH for the UE.

Figure 7:
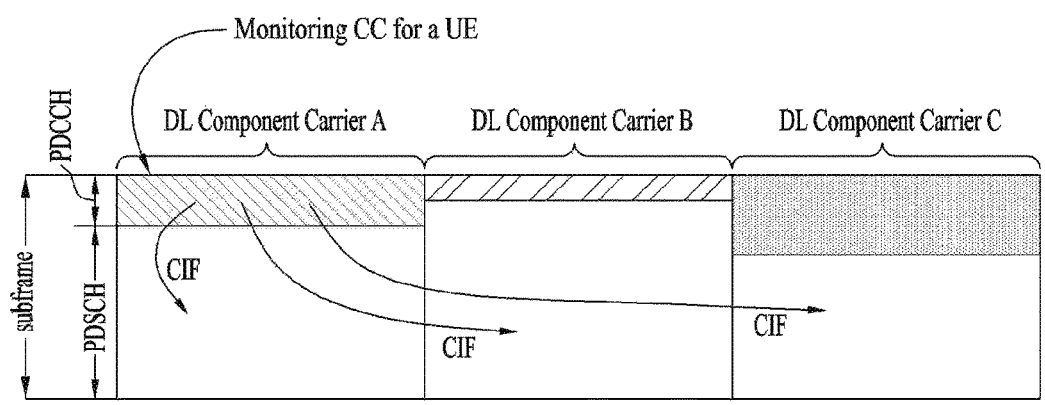
FIG. 7 illustrates a subframe structure of an LTE-A system according to cross-carrier scheduling.

FIG. 7 illustrates a cross carrier-scheduled subframe structure in the LTE-A system, which is used in embodiments of the present disclosure.

Referring to FIG. 7, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

Figure 8:
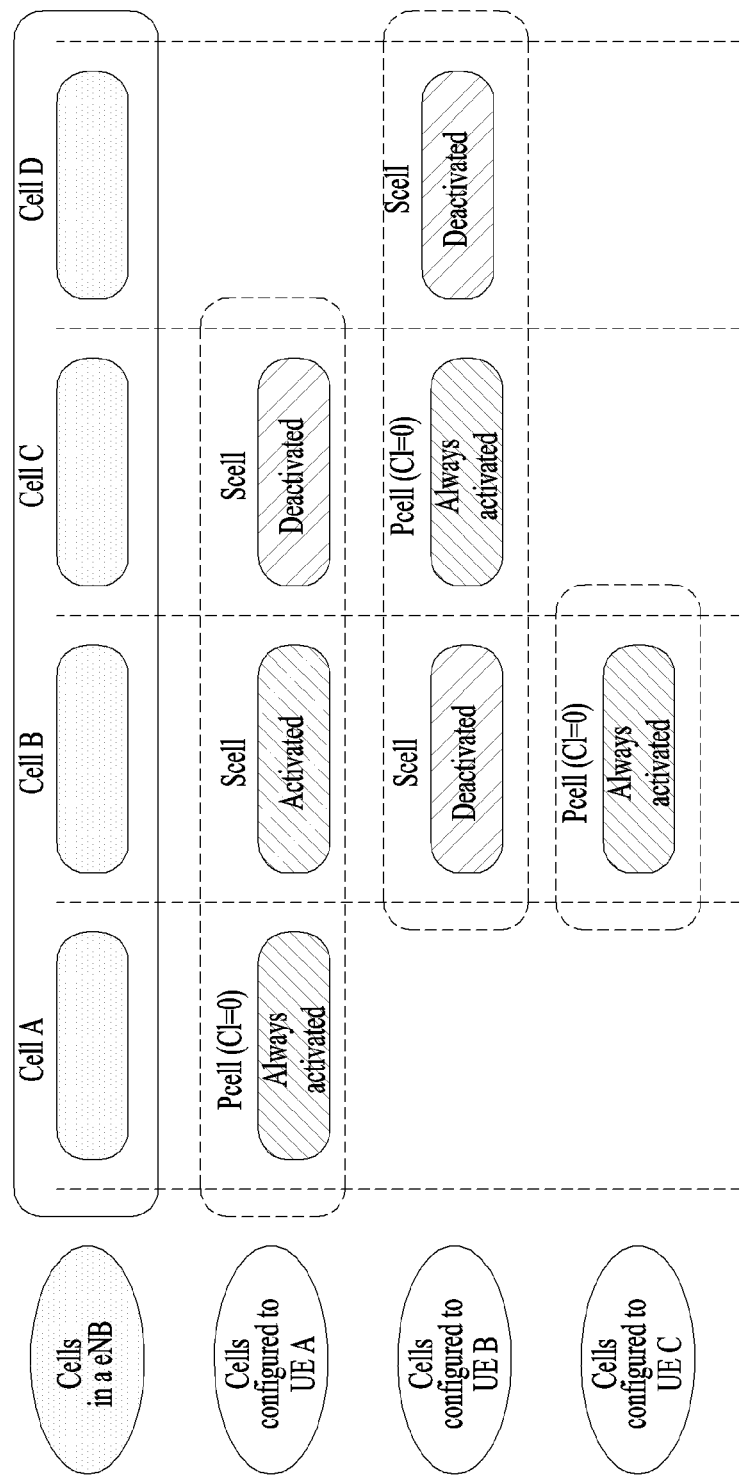
FIG. 8 is conceptual diagram illustrating a construction of serving cells according to cross-carrier scheduling.

FIG. 8 is conceptual diagram illustrating a construction of serving cells according to cross-carrier scheduling.

Referring to FIG. 8, an eNB (or BS) and/or UEs for use in a radio access system supporting carrier aggregation (CA) may include one or more serving cells. In FIG. 8, the eNB can support a total of four serving cells (cells A, B, C and D). It is assumed that UE A may include Cells (A, B, C), UE B may include Cells (B, C, D), and UE C may include Cell B. In this case, at least one of cells of each UE may be composed of P Cell. In this case, P Cell is always activated, and S Cell may be activated or deactivated by the eNB and/or UE.

The cells shown in FIG. 8 may be configured per UE. The above-mentioned cells selected from among cells of the eNB, cell addition may be applied to carrier aggregation (CA) on the basis of a measurement report message received from the UE. The configured cell may reserve resources for ACK/NACK message transmission in association with PDSCH signal transmission. The activated cell is configured to actually transmit a PDSCH signal and/or a PUSCH signal from among the configured cells, and is configured to transmit CSI reporting and Sounding Reference Signal (SRS) transmission. The deactivated cell is configured not to transmit/receive PDSCH/PUSCH signals by an eNB command or a timer operation, and CRS reporting and SRS transmission are interrupted.

3. Channel Encoding

In a wireless access system, a transmitting end performs coding on information, signals, and/or messages to be transmitted using a forward error correction code and then transmits the coded information, signals, and/or message. Thus, a receiving end can correct errors that occur in wireless channels.

The receiving end demodulates a received signal, performs decoding of the forward error correction code, and then restores the received signal. That is, through such a decoding process, the receiving end can correct the errors in the received signal, which occur in the wireless channels. Although various types of forward error correction codes are available, the present invention will be described based on a turbo code.

Figure 9:
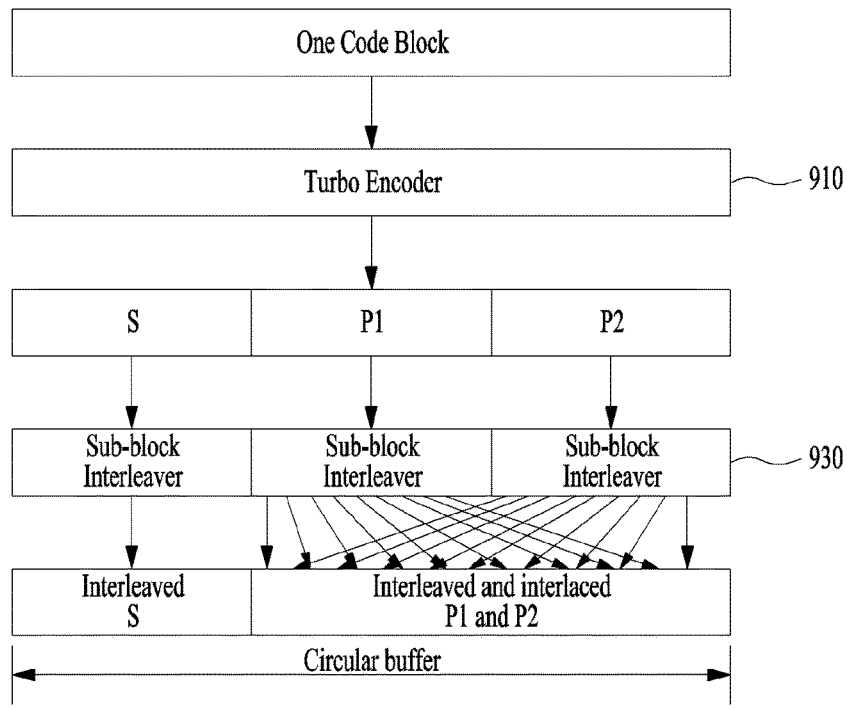
FIG. 9 is a diagram illustrating an example of rate matching based on a turbo coder that can be used in the embodiments of the present invention.

FIG. 9 is a diagram illustrating an example of rate matching based on a turbo coder that can be used in the embodiments of the present invention.

A turbo coder may include a recursive systematic convolution code and an interleaver. When a turbo code is actually implemented, an interleaver for facilitating parallel decoding may be used. Such an interleaver may include a quadratic polynomial permutation (QPP) interleaver. The QPP interleaver shows good performance in a specific transport block (i.e., data block) size and turbo code performance increases as a transport block size (TBS) increases. Thus, in the wireless access system, a certain size of a transport block is divided into a plurality of small transport blocks and then encoding is performed on the divided transport blocks to easily implement the turbo code. In this case, each of the divided transport blocks is referred to as a code block.

In general, such code blocks have the same size. However, one specific code block among several code blocks may have a different size due to limitation of size of the QPP interleaver. A transmitting end performs a forward error correction procedure on the basis of a predetermined size of interleaver code block. Referring to FIG. 9, one code block is inputted into a turbo coder 910. The turbo coder 910 performs ⅓ coding on the inputted code block and then outputs a systematic block and parity blocks 1 and 2.

Thereafter, the transmitting end performs interleaving on each block using a sub-block interleaver 930 to reduce effects of a burst error that may occur when data is transmitted through a wireless channel. The transmitting end maps the interleaved code block to actual radio resources and then transmits the code block.

Since the amount of radio resources used for transmission is constant, the transmitting end needs to perform rate matching on the encoded code block to match the amount of radio resources with the amount of radio resources to be used for transmission. Generally, rate matching may be performed by puncturing or repeating data.

The rate matching may be performed on the basis of an encoded code block as in WCDMA of 3GPP. As another method, interleaving may be independently performed by separating the systematic block and the parity blocks of the encoded code block from each other. As described above, FIG. 9 shows a case in which rate matching is performed by separating a systematic block and parity blocks.

A cyclic redundancy code (CRC) for error detection is attached to a transport block transmitted from a higher layer of the transmitting end. In addition, the CRC is attached to each code block included in the transport block. Depending on service types of the higher layer, various sizes of transport blocks need to be defined. However, the transmitting end needs to perform quantization to transmit transport blocks to the receiving end. For the transport block quantization, a dummy bit is added so that a source transport block transmitted from the higher layer and a transport block of a physical layer have the same size. In this case, it is preferred to perform the quantization such that the amount of added dummy bits is minimized.

In the embodiments of the present invention, a transport block size, a modulation and coding scheme (MCS), and the amount of allocated resources are interconnected with each other. That is, a value of a certain parameter is determined by values of the other two parameters. Thus, if a transmitting end and/or a receiving end intends to signal the corresponding parameters, the transmitting end and/or the receiving end can inform its own peer device of only two of three parameters.

For convenience of description, it is assumed that a transmitting end uses the MCS and parameters associated with the amount of allocated resources to inform a receiving end of a TBS.

In this case, a pilot signal or a reference signal (RS) for estimating a channel according to an antenna configuration and a resource for transmitting control information may have an influence on the amount of allocated resources. However, such factors may vary in each transmission.

4. TBS Configuration Method for MTC UE 4.1 MTC UE

In the LTE-A system (i.e., system after Rel-12), implementation of a low-price/low-end UE focusing on data communication such as reading of a meter, measurement of a water level, utilization of a monitoring camera, stock management of a vending machine, etc. is considered for the next generation wireless communication system. In the embodiments of the present invention, such a low-price/low-end UE is referred to as a machine type communication (MTC) UE for convenience.

In the case of the MTC UE, since the amount of transmitted data is relatively small and uplink/downlink data transmission and reception is performed occasionally, it is efficient to lower a price of the MTC UE and reduce battery consumption according to the low data transmission rate. Such an MTC UE has a characteristic of low mobility and thus its channel environment is rarely changed. In the current LTE system, it has been considered that the MTC UE needs to have coverage wider than that of the conventional UE. To this end, various techniques for coverage enhancement have been also discussed Compared to the legacy UE (i.e., normal UE), the MTC UE could be installed in an area with poor transmission conditions (e.g., a basement, etc.). Thus, a relay node can be installed for such MTC UEs but the cost of investment in facilities may be too high.

The MTC means a communication scheme for performing machine-to-machine communication without human intervention. Smart metering is considered as a representative application of the MTC. The smart metering is a technique of transmitting measured information periodically by attaching a communication module to a meter such as a power meter, a gas meter, or a water meter.

In general, a power, gas, or water meter operates with a battery included in an MTC UE. To reduce additional costs for exchanging the MTC UE's battery, it is preferred to design the MTC UE such that power consumption is minimized for long battery life.

In addition, considering the fact that the MTC UE is produced and supplied at low price, the MTC UE can be designed to support a very narrow band only (equal to or smaller than 6 RBs, e.g., 1 RB, 2 RBs, 3 RBs, 4 RBs, 5 RBs, or 6 RBs) unlike a general cellular system. In this case, the MTC UE cannot perform decoding on a DL control channel transmitted over the full system band similar to that of the general cellular system. Moreover, control information for the MTC UE cannot be transmitted. Thus, the amount of control information for the MTC UE decreases and the amount of resources for data transmission at the MTC UE also decreases. To solve this problem, methods of configuring a TBS optimized for an MTC UE will be described in the following embodiments of the present invention.

4.2 TBS Configuration Method

The MTC UE can be configured to transmit and receive data through a narrow band (equal to or smaller than 6 RBs, e.g., 1 RB, 2 RBs, 3 RBs, 4 RBs, 5 RBs, or 6 RBs). Although in the embodiments of the present invention, it is assumed that the MTC UE is allocated resources up to 6 RBs, the embodiments can be equally applied to different sizes of narrowbands. In addition, it is also assumed that an eNB supports normal UEs and MTC UEs. Here, the normal UE means a UE operating in the conventional cellular system except the MTC UE and the conventional cellular system may mean the current LTE/LTE-A system.

In the current LTE/LTE-A system, there are 168 REs (12 subcarriers*14 OFDM symbols) in each PRB pair. In this case, up to three OFDM symbols (36 REs) may be used for a PDCCH and 12 REs may be used for CRS transmission when the 2-port antenna is used. Thus, up to 120 REs can be used for PDSCH allocation.

To calculate the TBS, the MTC UE needs to assume a size of an RE that can be used for DL data transmission. That is, since the MTC UE can receive and decode up to 6 RBs irrespective of the system bandwidth of the eNB, it is assumed that a PDSCH for data transmission is not allocated to first three OFDM symbols of a subframe in which a DL control channel is transmitted. In addition, it is assumed that the number of transmit antennas of the eNB is two and a DL control channel for MTC is transmitted in the first three OFDM symbols.

Considering the above-mentioned assumptions, 88 REs are allocated to the PDSCH for the MTC UE in DL in each PRB pair. For example, the 88 REs can be obtained by subtracting the 36 REs, which correspond to the up to three OFDM symbols associated with the DL control channel for the MTC, from the 120 REs and then adding 4 REs that are subtracted twice from the 120 REs.

4.2.1 Method of Using Conventional TSB Table

Hereinafter, a description will be given of a method of using a predefined TSB table instead of defining a new TBS table for an MTC UE.

The TBS table (cf., Table 7.1.7.2.1-1 in TS 36.213) defined in the legacy LTE/LTE-A system is configured on the assumption that 120 REs are present in each PRB pair. If the existing TBS table is used for the MTC UE, the MTC UE may perform scaling on the TBS value depending on the actually signaled MCS index using Equation 3 and Equation 4 and then use the scaled TBS value. In other words, the MTC UE may use the TBS including RBs, which are decreased at a predetermined rate, rather than actually allocated RBs.

Equation 3

$$N'_{PRB} \times y \quad \text{[Equation 3]}$$

In Equation 3, y indicates a ratio of the number (n) of REs that can be allocated for the MTC UE to the number (m) of REs that can be allocated for the normal UE, i.e., n/m. For instance, when 88 REs are allocated for the MTC UE and 120 REs are allocated for the normal UE, y can be set to 88/120 (y=88/120). In addition, in Equation 3, $N'_{PRB}$ indicates the number of RBs allocated through a DL control channel. That is, the UE can calculate $N_{PRB}$ as shown in Equation 4 below and then derive TBS based on the calculated $N_{PRB}$.

Equation 4

$$N_{PRB} = \max(\lfloor N'_{PRB} \times y \rfloor, 1) \quad \text{[Equation 4]}$$

Figure 10:
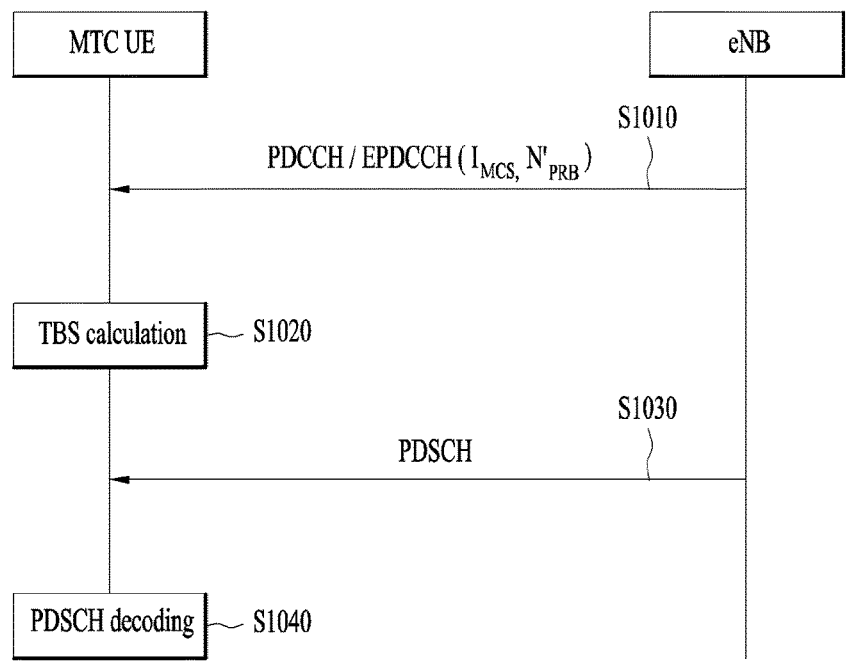
FIG. 10 is a diagram for explaining a TBS configuration method for an MTC user equipment.

FIG. 10 is a diagram for explaining a TBS configuration method for an MTC UE.

An eNB can inform an MTC UE of $I_{MCS}$ and $N'_{PRB}$ through a PDCCH or an E-PDCCH [S1010].

Subsequently, the MTC can calculate $N_{PRB}$ based on $N'_{PRB}$ received in the step S1010 using the method described with reference to Equation 3 and Equation 4. Eventually, the MTC UE can calculate or derive a TBS represented by $I_{MCS}$ and $N_{PRB}$.

As another example of the present embodiment, instead of using Equation 3 and Equation 4, the MTC UE can calculate the TBS for itself as follows. That is, the MTC UE derives $I_{TBS}$ from Table 6 based on $I_{MCS}$ received in the step S1010 and then multiplies y to the TBS, which is derived from the existing TBS table based on $I_{TBS}$ and $N_{PRB}$.

Thereafter, the MTC UE can receive and decode a PDSCH transmitted from the eNB based on the calculated TBS value [S1030 and S1040].

However, when the TBS is calculated as described above, granularity of $N_{PRB}$ is increased. Thus, the TBS may be different from the TBS optimized for the MTC UE.

Further, although FIG. 10 shows a case in which transmission and reception is performed through a PDSCH, the invention can be equally applied to a case in which transmission and reception is performed through a PUSCH.

4.2.2 Method of Configuring New TBS Table

Hereinafter, a description will be given of methods of configuring a TBS using a new TBS table for an MTC UE. When the new TBS table is configured, a new signaling procedure and control signal transmission for the new TBS table are required in a wireless access system supporting MTC. That is, the TBS optimized for the MTC UE is beneficial in spite of the burden of the new signaling procedure and control signal transmission.

Table 7 is an exemplary TBS table that is configured on the assumption that 88 REs are allocated for a PDSCH in each PRB pair.

TABLE 7

| $I_{TBS}$ | $N_{PRB}$ | | | | | |
|---|---|---|---|---|---|---|
|  | 1 | 2 | 3 | 4 | 5 | 6 |
| 0 | 16 | 16 | 40 | 56 | 80 | 104 |
| 1 | 16 | 32 | 56 | 80 | 104 | 136 |
| 2 | 16 | 40 | 72 | 104 | 136 | 176 |
| 3 | 16 | 56 | 104 | 152 | 200 | 232 |
| 4 | 32 | 80 | 136 | 176 | 248 | 296 |
| 5 | 40 | 104 | 176 | 232 | 304 | 376 |
| 6 | 56 | 136 | 208 | 288 | 376 | 440 |
| 7 | 72 | 160 | 248 | 336 | 424 | 520 |
| 8 | 80 | 176 | 288 | 392 | 488 | 600 |
| 9 | 88 | 208 | 320 | 440 | 552 | 680 |
| 10 | 104 | 232 | 376 | 488 | 632 | 744 |
| 11 | 120 | 272 | 424 | 568 | 712 | 872 |
| 12 | 152 | 320 | 488 | 648 | 808 | 1000 |
| 13 | 160 | 344 | 552 | 744 | 936 | 1128 |
| 14 | 176 | 392 | 616 | 808 | 1032 | 1256 |
| 15 | 200 | 424 | 648 | 872 | 1096 | 1320 |
| 16 | 208 | 456 | 696 | 936 | 1192 | 1416 |
| 17 | 248 | 504 | 776 | 1032 | 1320 | 1544 |
| 18 | 272 | 568 | 840 | 1160 | 1416 | 1736 |
| 19 | 296 | 616 | 936 | 1256 | 1544 | 1864 |
| 20 | 320 | 648 | 1000 | 1352 | 1672 | 2024 |
| 21 | 344 | 712 | 1096 | 1480 | 1800 | 2216 |
| 22 | 376 | 776 | 1160 | 1544 | 1992 | 2344 |
| 23 | 408 | 840 | 1256 | 1672 | 2088 | 2536 |
| 24 | 424 | 872 | 1320 | 1800 | 2216 | 2664 |
| 25 | 440 | 904 | 1384 | 1864 | 2344 | 2792 |
| 26 | 472 | 968 | 1416 | 1928 | 2408 | 2856 |

Specifically, Table 7 is a TBS table when only the QPSK, 16 QAM, and 64 QAM are supported. In this case, it is considered that the MTC UE does not support the 256 QAM modulation scheme due to implementation complexity.

Figure 11:
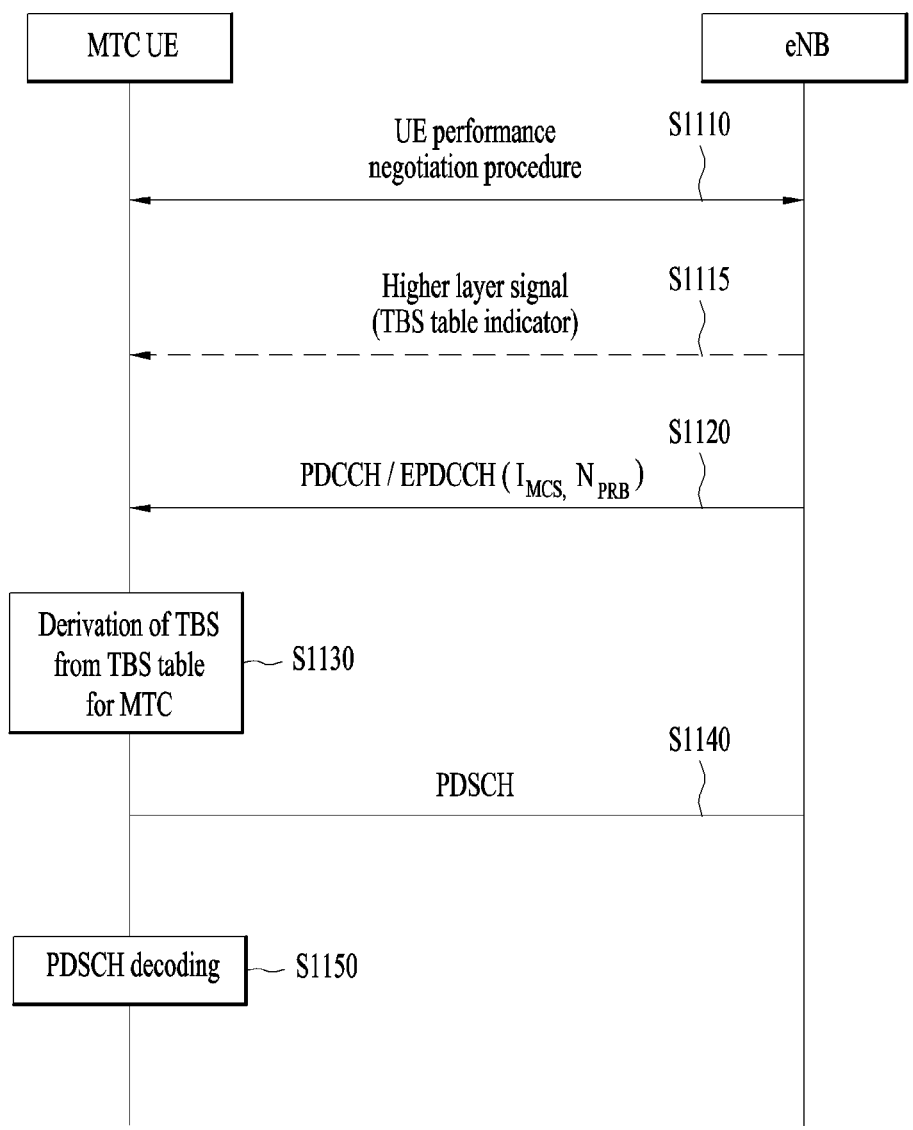
FIG. 11 is a diagram for explaining another TBS configuration method for an MTC user equipment.

FIG. 11 is a diagram for explaining another TBS configuration method for an MTC user equipment.

When an MTC UE initially accesses or re-accesses a network after turn-on, the MTC UE can perform a UE capability negotiation procedure with an eNB. Thereafter, the eNB can recognize that the corresponding UE is the MTC UE and then perform operation for supporting the MTC UE [S1110].

In this case, a wireless access system supporting MTC may maintain and manage a first TBS table for supporting normal UEs and a second TBS table for supporting MTC UEs.

Thus, when the MTC UE accesses the system, the eNB can transmit a TBS table indicator for indicating the TBS table for the MTC UE to the MTC UE through a higher layer signal [S1115].

The step S1115 can be selectively performed according to the system. If the step S1115 is not performed, the TBS table indicator can be transmitted to the MTC UE in the step S1110.

The eNB can inform the MTC UE of $I_{MCS}$ and $N_{PRB}$ through a PDCCH or an E-PDCCH [S1120].

The MTC can calculate $I_{TBS}$ using $I_{MCS}$ received in the step S1120 and then derive a TBS from Table 7, which is the second TBS table, based on $I_{TBS}$ and $N_{PRB}$ [S1130].

Thereafter, the MTC UE can receive and decode a PDSCH transmitted from the eNB based on the derived TBS [S1140 and S1150].

Further, although FIG. 11 shows a case in which transmission and reception is performed through a PDSCH, the invention can be equally applied to a case in which transmission and reception is performed through a PUSCH.

4.2.3 TBS Restriction Method

As described above, the MTC UE needs to be produced at low price. Thus, the maximum TBS that can be supported by the MTC UE may be restricted. In other words, it is assumed that the MTC UE cannot transmit and receive a TBS equal to or greater than a prescribed size. For example, it is assumed that the MTC UE cannot transmit and receive a TBS equal to or greater than 1000 bits.

If determining that a TBS calculated through a combination of $I_{TBS}$, which is derived based on $I_{MCS}$ transmitted through a DL control channel, and $N_{PRB}$ is equal to or greater than 1000 bits, the MTC UE may not decode the corresponding TBS.

As another method, when the TBS calculated through the combination of $I_{TBS}$ and $N_{PRB}$ is equal to or greater than 1000 bits, the MTC UE may perform decoding by assuming that the corresponding TBS is a specific size (e.g., 1000 bit).

The TBS restriction method can be applied to the methods described in the sections 4.2.1 and 4.2.2. Therefore, when the calculated or derived TBS is equal to or greater than a predetermined value, the MTC UE can drop PDSCH decoding or perform the PDSCH decoding using a specific TBS.

5. Apparatuses

Apparatuses illustrated in FIG. 12 are means that can implement the methods described before with reference to FIGS. 1 to 11.

A UE may act as a transmission end on a UL and as a reception end on a DL. An eNB may act as a reception end on a UL and as a transmission end on a DL.

That is, each of the UE and the eNB may include a Transmitter (Tx) 1240 or 1250 and a Receiver (Rx) 1260 or 1270, for controlling transmission and reception of information, data, and/or messages, and an antenna 1200 or 1210 for transmitting and receiving information, data, and/or messages.

Each of the UE and the eNB may further include a processor 1220 or 1230 for implementing the afore-described embodiments of the present disclosure and a memory 1280 or 1290 for temporarily or permanently storing operations of the processor 1220 or 1230.

The embodiments of the present invention will be performed using the components and functions of the UE and the eNB. For example, the processor of the eNB may determine the uplink or downlink HARQ process of the MTC UE in the FDD or TDD system by combining the methods disclosed in Chapters 1 to 4. For details, refer to Chapter 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 12 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1280 or 1290 and executed by the processor 1220 or 1230. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of receiving data by user equipment (UE) in a wireless access system supporting a machine type communication (MTC), the method comprising:
   receiving a modulation and coding scheme (MCS) index for an MCS and a physical resource block (PRB) index for a size of a PRB allocated to the UE;
   deriving a transport block size (TBS) for the MTC based on a TBS index for a TBS, which is derived based on the MCS index, and the PRB index; and
   decoding a physical downlink shared channel (PDSCH) based on the TBS for the MTC to receive data,
   wherein the wireless access system supporting the MTC supports a narrow band compared to a wireless access system not supporting the MTC,
   wherein the TBS for the MTC is defined to be suitable for transmission and reception of the PDSCH through the narrow band, and
   wherein when deriving the TBS for the MTC, the UE calculates the TBS for the MTC using a ratio n/m of the n number of resource elements (REs) that can be allocated to the UE to the m number of REs that can be allocated to a UE not supporting the MTC,
   wherein n and m are integers.

2. The method of claim 1, wherein deriving the TBS for the MTC comprises:
   deriving the TBS for the MTC from a second TBS table newly defined for the UE and wherein the second TBS table is configured to support up to 6 PRBs.

3. The method of claim 2, further comprising:
   receiving a higher layer signal instructing the UE to use the newly defined second TBS table.

4. A user equipment (UE) for receiving data in a wireless access system supporting machine type communication (MTC), the UE comprising:
   a receiver; and
   a processor, operatively coupled to the receiver,
   wherein the processor is configured to:
   control the receiver to receive a modulation and coding scheme (MCS) index for an MCS and a physical resource block (PRB) index for a size of a PRB allocated to the UE;
   derive a transport block size (TBS) for the MTC based on a TBS index for a TBS, which is derived based on the MCS index, and the PRB index; and
   decode a physical downlink shared channel (PDSCH) based on the TBS for the MTC to receive data,
   wherein the wireless access system supporting the MTC supports a narrow band compared to a wireless access system not supporting the MTC,
   wherein the TBS for the MTC is defined to be suitable for transmission and reception of the PDSCH through the narrow band, and
   wherein when deriving the TBS for the MTC, the processor calculates the TBS for the MTC using a ratio n/m of the n number of resource elements (REs) that can be allocated to the UE to the m number of REs that can be allocated to a UE not supporting the MTC,
   wherein n and m are integers.

5. The UE of claim 4, wherein the processor is configured to:
   derive the TBS for the MTC from a second TBS table newly defined for the UE and wherein the second TBS table is configured to support up to 6 PRBs.

6. The UE of claim 5, wherein the processor is configured to:
   control the receiver to further receive a higher layer signal instructing the processor to use the newly defined the second TBS table.

* * * * *